Feb. 8, 1966  E. K. DOCKSTADER  3,233,843
DIFFERENTIAL TORQUE GENERATOR FOR WINDER
Filed Feb. 21, 1962
FIG. I
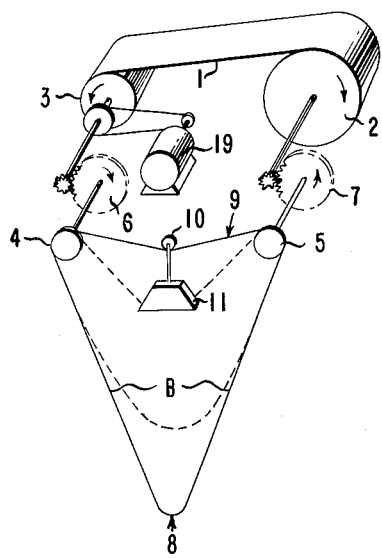
FIG. II
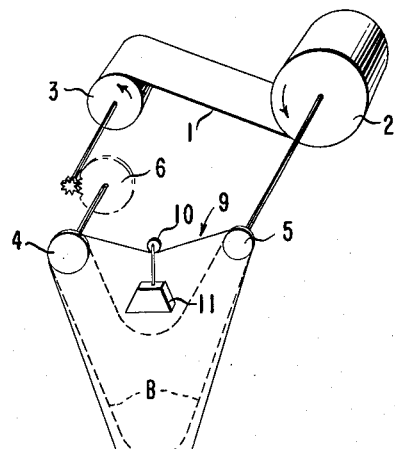
FIG. III
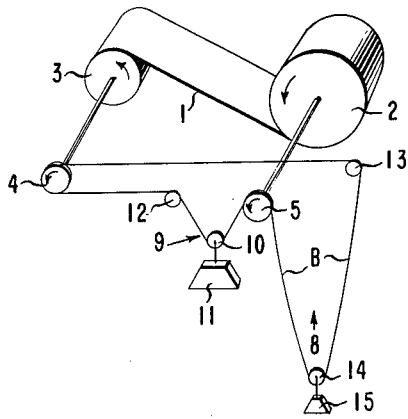
FIG. IV
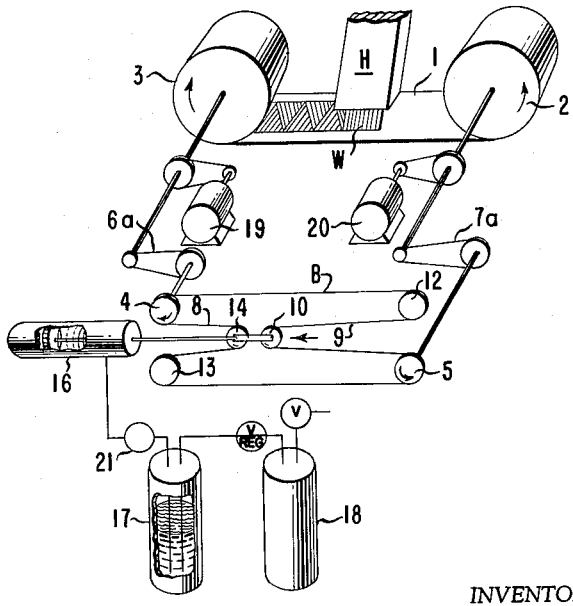
INVENTOR
ERNEST KNEALE DOCKSTADER
BY *P. J. Poindexter*
AGENT United States Patent Office 3,233,843
Patented Feb. 8, 1966

3,233,843
DIFFERENTIAL TORQUE GENERATOR
FOR WINDER
Ernest K. Dockstader, Kennett Square, Pa., assignor to
E. I. du Pont de Nemours and Company, Wilmington,
Del., a corporation of Delaware
Filed Feb. 21, 1962, Ser. No. 174,749
5 Claims. (Cl. 242—75.5)

This invention relates to an apparatus capable of developing a controlled differential torque. It further relates to an apparatus capable of developing a controlled differential torque substantially independent of the torques required to otherwise operate the apparatus. It further, in particular, relates to apparatus capable of generating a controlled tension in a length of material being passed between a pair of rolls by means of a differential torque substantially independent of the primary torque required to turn said rolls.

It is an object of this invention to provide an apparatus for generating a controllable differential torque in a pair of shafts, mandrels or other rotary members. It is a further object to provide an apparatus and a method for winding up a roll of material, i.e., plastic film, aluminum foil, steel strip, screening, woven fabric, non-woven webs, yarns, ropes and the like at a substantially constant and controllable tension. It is another object of this invention to provide a method for tensioning screen conveyors used to receive crosslapped webs in crosslapping machines. It is a further object to provide an apparatus which will wind up roll material under controlled tension substantially independent of the torque required to wind up such roll materials. It is a further object to provide a simple and economical mechanism to generate such tension without resort to special motors, drag generators and complicated electrical circuits, or to expensive and complicated hydraulic motors, torque convertors and their necessary controls. It is a still further object to provide an apparatus which, via a controlled differential torque, is capable of absorbing transitory shock torque loads.

The objects of this invention can be attained via an apparatus which comprises, along with two primary rotary members and the means to rotate them via a primary torque, a pair of secondary rotary members connected one to each of said primary members and a means to generate in said secondary members opposed and substantially equal torques (i-e., differential torque) by applying a controlled tangental force to the peripheries of said secondary members, transmitting said differential torque to said primary members.

The construction, operation and advantages of the apparatus of this invention can be made more clearly apparent by reference to the appended drawings wherein:

FIGURE I is a perspective of a simplified mechanical system for applying, by means of a hanging weight, controlled tension to a length of material being wound up.

FIGURE II shows a variation in the gearing of FIGURE I to accomplish the same result.

FIGURE III is a perspective view of an alternative means for applying constant tension to a revolving belt.

FIGURE IV is a perspective view illustrating an apparatus to collect crosslapped webs on a screen conveyor maintained at constant tension by this method.

In these drawings FIGURES I to IV, the general combination of the various units set forth by this invention can be seen (a) the primary rotary members 2 and 3; (b) the source of the primary torque 19; (c) the secondary rotary members 4 and 5; (d) their interconnection, one to each of the primary members, via 6 and 7; (e) the means 10 and 11 for generating the controlled tangential force acting on the peripheries of the secondary members 4 and 5; (f) the common means, belt B, for applying this force to the peripheries of 4 and 5, generating therein and in turn transmitting the opposed secondary torques therefrom to the primary members 2 and 3. The opposed torques thereafter are translatable into a tension in strip 1. It will be noted that belt B has thereby two runs of different character: run 9, the thrust run, which is maintained by 10 and 11 under tension, and run 8, the slack run, which operates at a lower tension than 9 and at least the minimum sufficient to maintain substantial non-slip contact with members 4 and 5. The control of the tension on thrust run 9 thus controls the torque differential between 2 and 3 and in turn controls the tension on material 1. In all of these diagrams the arrows show solely the direction of the torques or tension forces involved; the actual directions of rotation are not shown.

Referring to FIGURE I, a strip of material 1 is unwound from drum 2 to drum 3 by means of the independent primary torque drive 19. Tension is applied to strip 1 by means of the rotating belt or chain B acting upon the wheels 4 and 5 to generate the opposed secondary torques through their respective gear trains 6 and 7 to the drums 2 and 3. Belt B hangs essentially free on slack run 8 but without losing positive grip on wheels 4 and 5. Tension is applied to thrust run 9 via the roller 10 and the suspended weight 11. The dotted lines show progressively the raising position of run 8 and the lowering of weight 11 as material is transferred from drum 2 to drum 3.

An alternate method is carried out by means of an apparatus illustrated by FIGURE II wherein a strip 1 is transferred from drum 2 to drum 3. Gear train 6 only is required to provide proper direction of rotation of 4 and 5 so that tension can be maintained. Obviously train 6 can be eliminated if strip 1 winds up on 3 from the bottom rather than the top as shown. The independent torque drive is not shown.

Another alternate method involves an apparatus illustrated by FIGURE III wherein tension is applied, to the drums or mandrels 2 and 3 and the strip 1, through wheels 4 and 5. As in the case of the apparatus illustrated in FIGURES I and II, roller 10 and weight 11 shown in FIGURE III, provide the necessary thrust on run 9. Fixed rollers 12 and 13 provide the necessary change of direction and roller 14 and weight 15 (smaller than weight 11) provide a simple means for maintaining positive contact of run 8 with wheels 4 and 5 while both maintaining the required compensating slack and keeping run 8 straight and smooth running. The independent torque drive is not shown in FIGURE III.

A preferred embodiment of this invention involves the apparatus illustrated by FIGURE IV wherein tension is provided on a reciprocating conveyor screen of a crosslapping machine described in copending application S.N. 160,803, filed December 20, 1961 by J. L. Hollowell.

Referring to FIGURE IV, a crosslapper head H deposits web W in a zigzag fashion on reciprocating screen 1. Screen 1 reciprocates by alternately being wound up on drum 2 and drum 3 by individual motor drives 19 and 20. Tension in the direction of the arrows is independently applied through belt train 6 and 7 by the secondary torques on wheels 4 and 5 as before. These torques are placed on fixed sprockets 4 and 5 in turn through thrust run 9 of rotating chain B by the tension leftwards (as in the drawing) on movable roller 10 connected to hydraulic cylinder 16. Constant pressure is maintained on this cylinder via hydraulic reservoir 17 and a high pressure gas (e.g., nitrogen) cylinder 18. Roller 14 on slack run 8 coupled in tandem to roller 10 provides the compensating slack and positive contact with wheels 4 and 5. Fixed idlers 12 and 13 provide the required change of direction.

Thus, independent of the direction of rotation of drums 2 and 3 by either of motors 19 or 20, constant tension can be maintained on the screen 1 via the applied gas pressure in reservoir 17. When the screen is being wound on drum 2, drum 3 turns relatively faster, slackening run 8 and driving the coupled rollers 10 and 14 to the right in the drawing. This forces fluid out of cylinder 16 back into reservoir 17 against the gas pressure. When the direction of the screen is reversed so that it is wound up on drum 3, then the coupled rollers are carried leftwards in the drawing as thrust run 9 begins to slacken under the relative increase in rotation of drum 2. Cylinder 16 takes up this slack and keeps this thrust and the tension applied on the screen 1 constant. A liquid surge control 21 is desirable.

Many variations to the layout and components of the above tensioning mechanism can be made within the scope of this invention. For example, thrust on the roller 10 (and 14 when appropriate as in FIGURE IV) can be applied by steam pressure, by pilot motor operated jack screw or by coiled springs. The relative sizes and positions of wheels 4 and 5 can be altered to accommodate various methods for applying this thrust and for obtaining the desired direction and amount of torque on drums 2 and 3. Gear or belt trains 6 and 7 can be accordingly selected to alter this torque. Belt B can be a chain, a serrated rubber timing belt or other device yielding positive transfer of motion. Wheels 4 or 5 can accordingly be sprockets, serrated wheels, V groove pulleys, etc., which will positively engage belt B without substantial creep or slippage.

It is to be noted that in the operation of each of the belt B driven machines of FIGURES I–IV, the direction of relative movement of the roller 10 depends primarily on the difference in effective diameter of the drums 2 and 3. Thus, in FIGURE IV, when 2 is smaller than 3, roller 10 will move in one direction while winding on 2 (e.g., right to left) but in the opposite direction (left to right) while unwinding from 2. The reverse situation prevails when 3 is smaller than 2. In winding on 2, the roller moves left to right and unwinding from 2, right to left.

A still further variation can be made. Considering FIGURE IV, if drives 19 and 20 are eliminated and drums 2 and 3 are replaced respectively by a torque producer, e.g., a motor, and a torque user, e.g., a machine, the apparatus can be used as a torque or shock load applier or absorber. Thus from a dead start, for example, the excess torque provided by the motor over that safely handled by the machine, would be absorbed by a movement of the units 10 and 14 and a displacement of the piston 16. Subsequently, as the machine increases in speed, the displacement of 10 and 14 would be restored. Other variations of this shock-load protection system can be made.

I claim:

1. An apparatus for generating a differential torque, said apparatus comprising
   (a) a pair of mandrels adapted to transfer from one to the other by simultaneous winding and unwinding a length of windable material under controlled tension;
   (b) means to apply a primary torque to said mandrels;
   (c) a pair of rotary secondary members interconnected one to each of said mandrels;
   (d) means to apply a tangential controlled force to the periphery of each of said secondary members to generate secondary torques therein; and
   (e) means to transmit said secondary torques, in an opposed and equal manner, to said mandrels to generate therebetween a differential torque substantially independent of the primary torque required to rotate said mandrels.

2. An apparatus for generating a differential torque, said apparatus comprising
   (a) a pair of drums adapted to be maintained substantially in non-slip contact with a strip of material movable transversely to the axis of said drums, said material being tensioned by contact with said drums;
   (b) means to apply a primary torque to said drums;
   (c) a pair of rotary secondary members interconnected one to each of said drums;
   (d) means to apply a tangential controlled force to the periphery of each of said secondary members to generate secondary torques therein; and
   (e) means to transmit said secondary torques, in an opposed and equal manner, to said drums to generate therebetween a differential torque substantially independent of the primary torque required to rotate said drums.

3. An apparatus for generating a differential torque, said apparatus comprising
   (a) a pair of interconnected rotary primary members;
   (b) means to apply a primary torque to said primary members;
   (c) a pair of rotary secondary members interconnected one to each of said primary members;
   (d) means to apply a tangential control force to the periphery of each of said secondary members to generate secondary torques therein, said means comprising
      (1) a continuous rotatable belt connecting and substantially in non-slip contact with said secondary members, and
      (2) means to apply a longitudinal force to said belt tensioning at least one run of said belt while maintaining a second run at a substantially lower tension; and
   (e) means to transmit said secondary torques, in an opposed and equal manner, to said rotary primary members to generate therebetween a differential torque substantially independent of the primary torque required to rotate said primary members.

4. The apparatus of claim 3 in which said rotatable belt is a chain, said secondary members are sprockets and the means to apply a longitudinal force is a hydraulically activated piston acting through a movable sprocket in the plane of an engaging said chain.

5. An apparatus for tensioning the flexible conveyor of a crosslapper substantially independent of the torque required to wind up said conveyor comprising:
   (a) a flexible conveyor;
   (b) a pair of spaced-apart drums adapted to transfer said flexible conveyor from one to the other by alternately winding and unwinding;
   (c) a pair of fixed wheels rotatably connected one to the axis of each drum;
   (d) a rotatable belt connecting said fixed wheels and having a thrust run and a slack run;
   (e) a pair of fixed idler wheels engaging said belt, one each respectively on said thrust and said slack runs;
   (f) a second pair of idler wheels connected together in tandem engaging one each, the slack and the thrust run of said belt, and adapted to move laterally in the plane of said belt;
   (g) means to apply a controlled thrust to said laterally movable idler wheels, thereby tensioning said thrust run of said belt and slackening said slack run of said belt.

References Cited by the Examiner

UNITED STATES PATENTS

| | | | |
|---|---|---|---|
| 934,716 | 9/1909 | Dodd | 74—682 |
| 2,367,777 | 1/1945 | Hornbostel | 242—75.5 |
| 2,470,125 | 5/1949 | Young | 242—75.5 X |
| 2,549,038 | 4/1951 | Zenner | 242—75.5 X |
| 2,901,191 | 8/1959 | Phelps | 242—75.1 X |

MERVIN STEIN, *Primary Examiner.*

JOSEPH P. STRIZAK, *Examiner.*